US 6,646,833 B1

(12) United States Patent
Kanai et al.

(10) Patent No.: US 6,646,833 B1
(45) Date of Patent: Nov. 11, 2003

(54) HEAD ASSEMBLY CAPABLE OF READING FLOPPY DISCS OF VARYING DENSITIES AND FLOPPY-DISC DRIVE INCORPORATING THE SAME

(75) Inventors: Fujio Kanai, Kanagawa (JP); Koji Takahashi, Kanagawa (JP); Hitoshi Saito, Kanagawa (JP); Yutaka Soda, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/407,170

(22) Filed: Sep. 28, 1999

(30) Foreign Application Priority Data

Sep. 30, 1998 (JP) ............................. 10-278988

(51) Int. Cl.[7] ............................................... G11B 21/16
(52) U.S. Cl. ....................................................... 360/245
(58) Field of Search ........................... 360/244.8, 244.2, 360/244.9, 245

(56) References Cited

U.S. PATENT DOCUMENTS 5,126,904 A * 6/1992 Sakurai .................... 360/244.2
5,270,889 A * 12/1993 Muratomi ................. 360/246.2
5,455,727 A * 10/1995 Baral et al. ............... 360/244.8
5,519,552 A    5/1996 Kohira et al. ............. 360/244.3
5,657,187 A * 8/1997 Hatch et al. .............. 360/244.8
5,771,136 A    6/1998 Girard ...................... 360/245.7
5,831,799 A * 11/1998 Kudo et al. ................ 360/121

FOREIGN PATENT DOCUMENTS

| EP | 0 342 625 | | 11/1989 |
| JP | 11066782 | | 3/1999 |
| JP | 11-149699 | * | 6/1999 |

* cited by examiner

Primary Examiner—David Davis
(74) Attorney, Agent, or Firm—Rader, Fishman & Grauer PLLC; Ronald P. Kananen

(57) ABSTRACT

A magnetic head device in which magnetic head elements can follow the signal recording surface of the first or second magnetic disc 6, 23. To this end, the magnetic head device includes a head unit 121 for recording/reproducing information signals for the first or second magnetic disc 6, 23, and a supporting arm 122 having a first portion 131 for supporting said head portion, a second portion 132 mounted on a supporting arm holding portion and a third portion 133 interconnecting said first and second portions 131 and 132. The first to third portions 131 to 133 of the supporting arm 122 are of different shapes so as to have different physical properties to follow the first or second magnetic disc 6, 23 under a desired condition.

3 Claims, 14 Drawing Sheets

HEAD ASSEMBLY CAPABLE OF READING FLOPPY DISCS OF VARYING DENSITIES AND FLOPPY-DISC DRIVE INCORPORATING THE SAME

BACKGROUND OF THE INVENTION

1. Field of the Invention

This invention relates to a magnetic head device for recording and/or reproducing information signals for a disc-shaped recording medium, such as a magnetic disc, and a disc drive device having this magnetic head device.

2. Description of the Related Art

Heretofore, there is known a disc cartridge comprised of a magnetic disc rotationally housed in a main controller body unit. This removable type of the disc cartridge may be exemplified by a disc cartridge having, as a information recording medium, a magnetic disc with a diameter of 3.5 inch, having a signal recording layer on a flexible disc substrate, or a so-called flexible disc.

The disc drive device, on which the above disc cartridge is loaded and which is adapted to record/reproduce information signals for a magnetic disc, includes a head unit for supporting a head portion having a magnetic head element adapted for recording/reproducing information signals for the magnetic disc, a supporting arm for supporting the head portion at its foremost part, a base plate supporting the proximal end of this supporting arm, and an arm holding member adapted to hold the supporting arm via this base plate. The supporting arm carries a head portion and a base plate at its foremost and rear parts, respectively. The head plate is mounted on an arm holding member. The base plate is mounted on the arm holding member supported on a movement unit.

The disc driving device also includes a disc rotating driving unit, made up of a movement unit for causing movement of the head portion in a direction along the radius of the magnetic disc via head unit, a disc table on which is loaded the magnetic disc and a spindle motor for rotationally driving the disc table.

When the disc cartridge is loaded into the main body portion of the disc driving device, the magnetic disc in the disc cartridge is set on the disc table and run in rotation. The supporting arm of the head unit is moved in the direction along the radius of the magnetic disc via a movement unit to record/reproduce information signals for the magnetic disc by the head portion.

Meanwhile, with an increasing capacity of handled information signals, there is proposed a large capacity disc cartridge holding therein a magnetic disc having an extremely high recording density in order to have the high recording density of tens to hundreds of megabytes in comparison with 2 megabytes of the conventional disc cartridge.

In this type of the large capacity disc cartridge, the track width and the pitch are reduced to assure high density of the recording tracks formed on the signal recording surface. To this end, if the magnetic head is rotationally deflected even to the slightest extent, without following up with the movement of the magnetic disc, due to disturbances, the magnetic head is deviated from the track to be accessed and becomes unable to follow the target recording track for tracking, and hence becomes unable to record/reproduce the information signals accurately.

The disc drive device for recording/reproducing the high capacity disc is configured so that, when recording/reproducing the information signals on the high capacity disc, the high capacity disc is run in rotation at an elevated speed, at the same time as the magnetic head element is slightly floated from the signal recording surface of the high capacity disc.

Moreover, the disc drive device is required to be compatible in the sense that it can record/reproduce information signals of a magnetic disc of the conventional recording density. The disc drive device for recording/reproducing a conventional magnetic disc of the recording capacity of, for example, 2 MB, and a high capacity disc, includes a head unit having two magnetic heads associated with the respective magnetic discs of different recording densities.

Thus, the head unit of the disc drive device, having two magnetic head elements, has the mass approximately ten times that of the magnetic head element owned by, for example, the hard disc drive, such that it is necessary to increase the toughness of the supporting arm.

Since the head portion records/reproduces information signals in the floating state with respect to the signal recording surface of the high capacity disc, the supporting arm needs to support the head portion so that the gap between the head portion and the signal recording surface of the high capacity disc will be of a desired value. That is, the position of the head portion with respect to the signal recording surface needs to be controlled to high accuracy.

Also, since the disc drive device needs to perform fine movement with respect to the recording track of the high capacity disc, designed to have a high recording density, the disc drive device includes a movement unit for causing movement of the supporting arm by electromagnetic driving power. The supporting arm however suffers from the problem that it cannot perform optimum movement if it is in resonant vibrations with the vibrations of the motor of the movement system. In particular, for recording/reproducing the high capacity disc, the supporting arm needs to be configured for evading the resonant frequency with the frequency of the vibrations generated by the spindle motor configured for rotationally driving the high capacity disc.

SUMMARY OF THE INVENTION

It is therefore an object of the present invention to provide a magnetic head device that allows for high precision follow-up of the magnetic head element with respect to the signal recording surface of the disc-shaped recording medium, and a disc drive device having this magnetic head device.

According to the present invention, there is provided a magnetic head device in which magnetic head elements can follow the signal recording surface of the first or second magnetic disc. The magnetic head device includes a head portion for recording/reproducing information signals for the first or second magnetic disc, and a supporting arm having a first portion for supporting said head portion, a second portion mounted on a supporting arm holding portion and a third portion interconnecting said first and second portions. The first to third portions of the supporting arm are of different shapes so as to have different physical properties to follow the first or second magnetic disc under a desired condition.

With the above-described magnetic head device, in which the supporting arm includes first to third portions of different shapes, the head portion follows the disc-shaped recording medium under a desired condition, so that the toughness and the resonant frequencies etc of respective portions are set to optimum values.

That is, the first, second or third portion of the supporting arm is shaped in such a manner as to take into account the toughness around an axis parallel to the longitudinal direction of the supporting arm, referred to below as the pitching direction, in order to optimize the initial attitude of the supporting arm relative to the disc-shaped recording medium.

Also, the first, second or third portion of the supporting arm is shaped in such a manner as to take into account the toughness which will realize an optimum value of the gap between the head portion and the signal recording surface of the disc-shaped recording medium, in order to optimize the follow-up characteristics of the head portion to the disc-shaped recording medium.

In addition, the first, second or third portion of the supporting arm is shaped in such a manner as to take into account the toughness around an axis parallel to the widthwise direction of the supporting arm, referred to below as the rolling direction, in order to evade resonance with the vibrations applied from outside.

According to the present invention, there is also provided a disc drive device including a head portion having a magnetic head element for recording and/or reproducing information signals for a disc-shaped recording medium, a supporting arm having a first portion for supporting said head portion, a second portion mounted on a supporting arm holding portion and a third portion interconnecting said first and second portions, and a supporting arm holding member having a receiving portion for receiving the second portion of the supporting arm for mounting therein. The supporting arm holding member holds the supporting arm, movement means for causing movement of the supporting arm holding member in the direction along the radius of the disc-shaped recording medium. The disc drive device of the present invention also includes driving means for rotationally driving the disc-shaped recording medium. The first to third portions of the supporting arm are of different shapes so as to have different physical properties to follow the first or second magnetic disc under a desired condition.

With the above-described disc drive device, in which the supporting arm includes first to third portions of different shapes, the head portion follows the disc-shaped recording medium under a desired condition, so that the toughness and the resonant frequencies etc of respective portions are set to optimum values.

That is, since the first portion, second portion or the third portion of the supporting arm is shaped to take into account the toughness in the pitching direction of the supporting arm, it is possible to optimize the initial attitude of the supporting arm with respect to the disc-shaped recording medium.

Also, since the first, second or third portion of the supporting arm is shaped in such a manner as to take into account the toughness which will realize an optimum value of the gap between the head portion and the signal recording surface of the disc-shaped recording medium, it is possible to optimize the follow-up characteristics of the head portion to the disc-shaped recording medium.

In addition, since the first portion, second portion or the third portion of the supporting arm is shaped to take into account the toughness in the rolling direction of the supporting arm, it is possible to evade resonance with vibrations produced by the movement means and the driving means.

With the disc drive device according to the present invention, it is possible to achieve high-precision follow-up of the head portion to the disc-shaped recording medium via the supporting arm. Thus, with the present disc drive device, it is possible to improve reliability in the recording/reproducing operation.

With the disc drive device according to the present invention, it is possible to achieve high-precision follow-up of the head unit to the disc-shaped recording medium via the supporting arm. Thus, with the present disc drive device, it is possible to improve reliability in the recording/reproducing operation.

DESCRIPTION OF THE PREFERRED EMBODIMENTS

Figure 1:
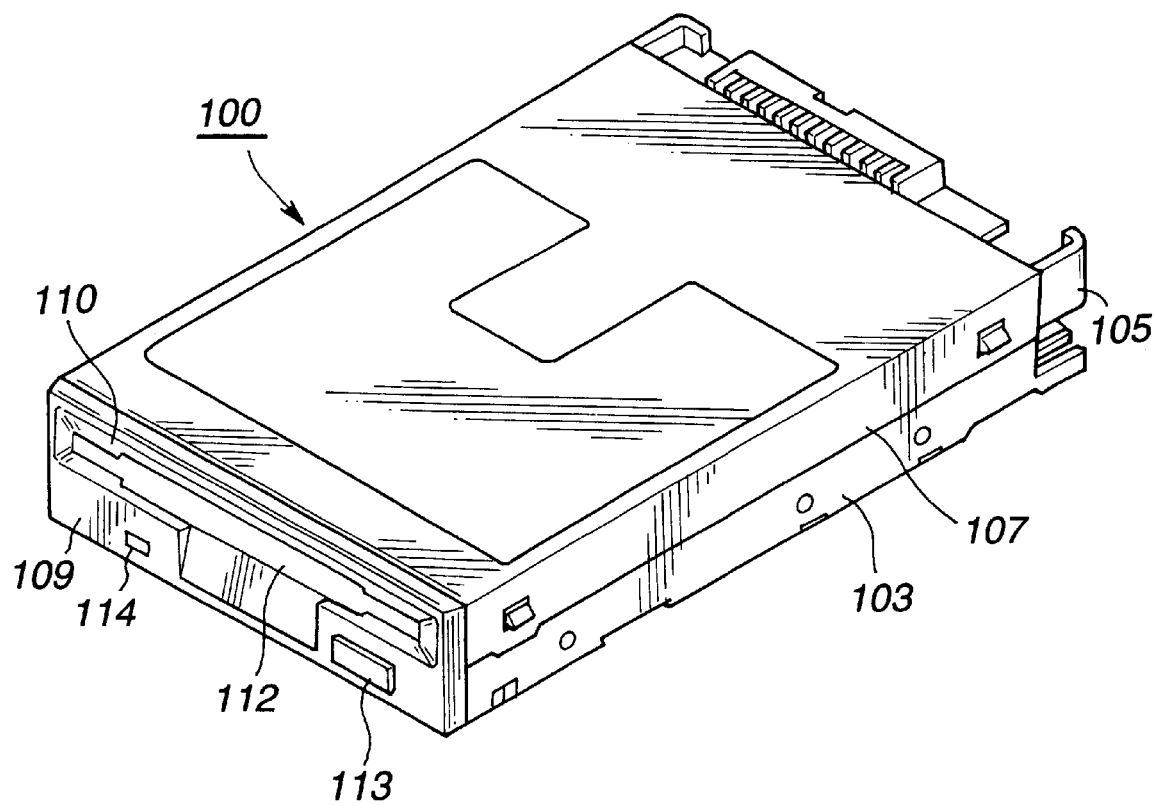
FIG. 1 is a perspective view showing a disc drive device according to the present invention.

Referring to the drawings, a disc drive device having a head unit of the present invention will be explained in detail.

Referring to FIG. 1, a disc drive device 100 is configured so that a disc cartridge having housed therein a magnetic disc as an information recording medium is adapted to be inserted into or taken out from the main body portion of the disc drive device 100. The disc drive device 100 is adapted to record/reproduce information signals as it selectively uses a first disc cartridge housing a first magnetic disc for which the information signals are adapted to be recorded/reproduced in association with the first recording density or a second disc cartridge housing a second magnetic disc for which the information signals are adapted to be recorded/reproduced in association with a second recording density higher than the first recording density.

Before proceeding to description of the display device 100 of the present invention, the first disc cartridge or the second disc cartridge used for the present disc drive device 100 is explained. The magnetic discs, housed in these disc cartridges, are of a diameter of 3.5 inch.

Figure 2:
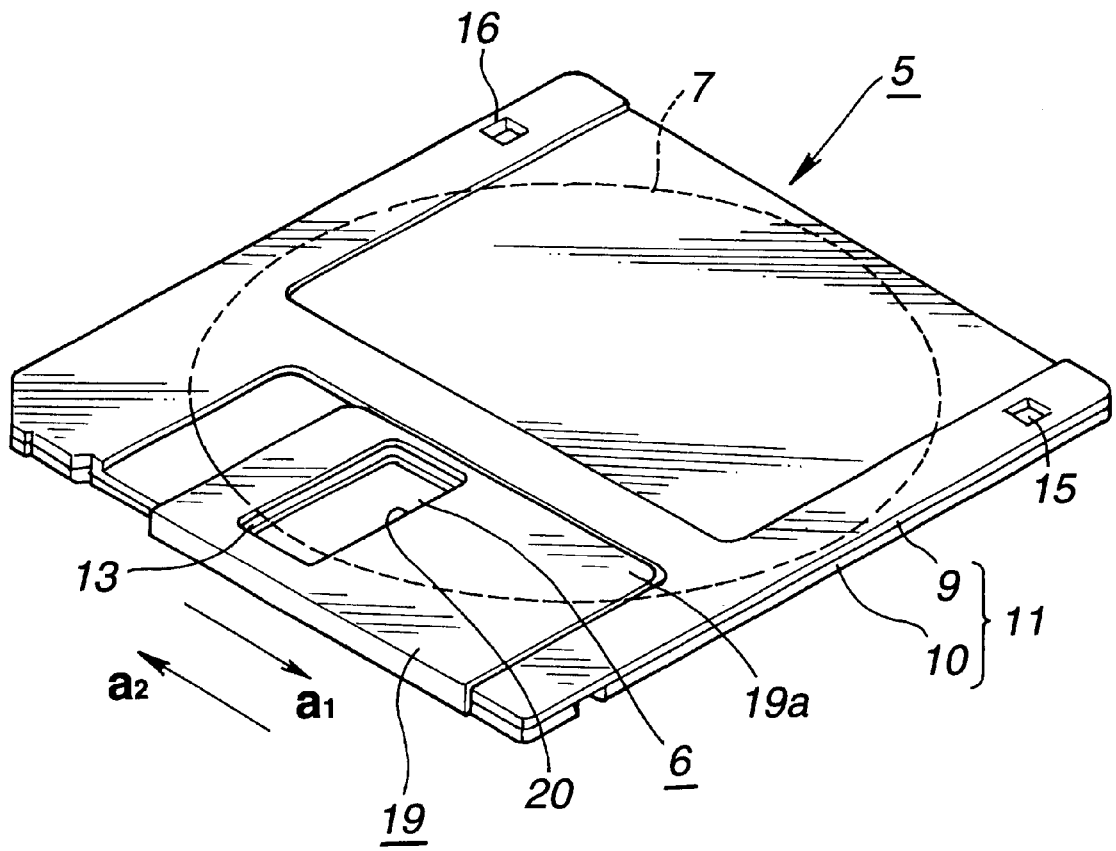
FIG. 2 is a perspective view showing a first disc cartridge applied to the disc drive device of FIG. 1.
Figure 3:
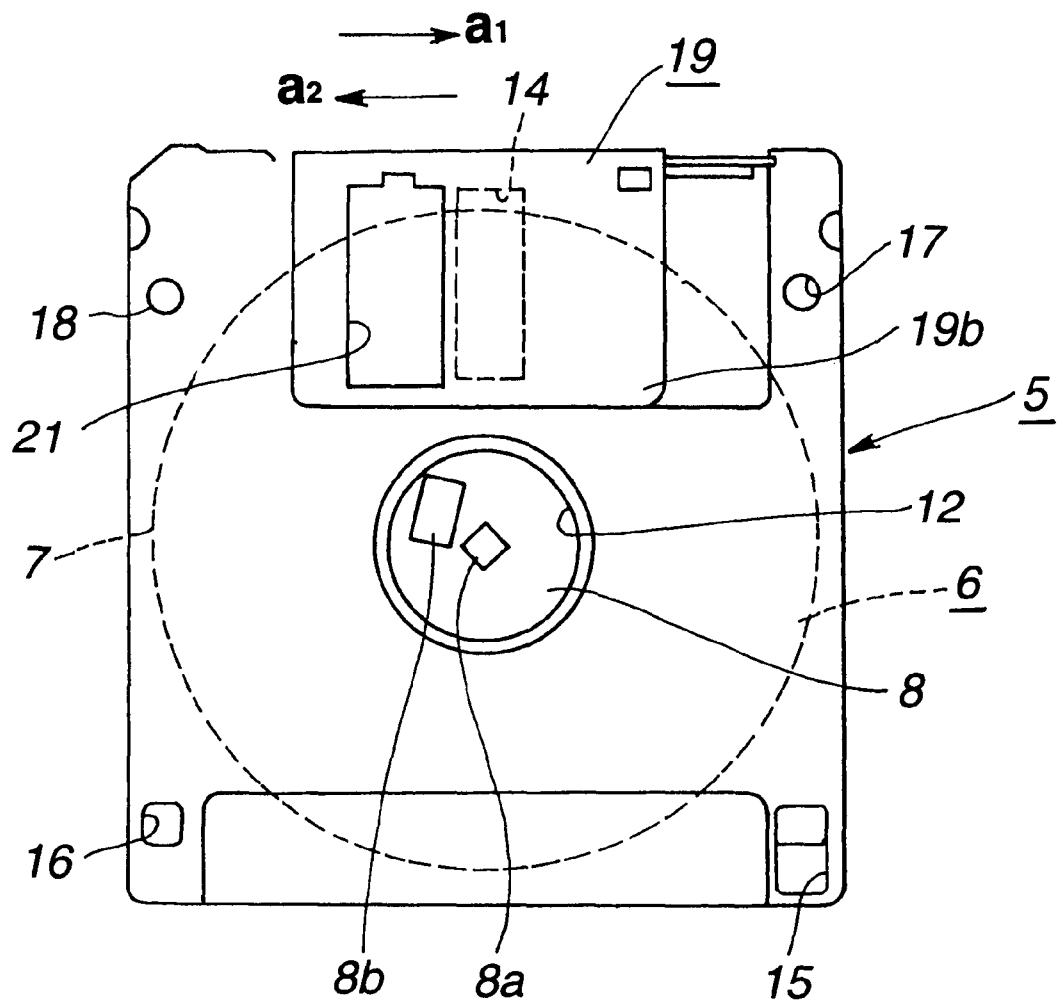
FIG. 3 is a bottom plan view of the first disc cartridge.

Referring to FIGS. 2 and 3, the first disc cartridge 5 houses a first magnetic disc 6 of a recording capacity of the order of 2 MB (megabyte), on which information signals are recorded at the first recording density. The first magnetic disc 6, housed in the first disc cartridge 5, has a disc substrate 7 of a flexible synthetic resin, on both major surfaces of which magnetic layers are deposited to form signal recording surfaces. The center of the disc substrate 7 is formed with a circular center opening and carries a hub 8 that closes the center opening. The hub 8 is formed of a magnetic material, such as stainless steel or iron, and is mounted on the disc substrate 7 by fitting a tubular projection into the center opening and by bonding the flange formed on the outer rim of the projection to the rim of the center opening. The center portion of the hub 8 is formed with a rectangular spindle opening 8a into which is inserted a spindle of the disc rotating driving unit provided on the disc drive device 100. In an offset portion from the center portion of the hub 100 is bored a rectangular driving pin engagement opening 8b engaged by a driving pin provided on the disc rotating driving unit.

The first magnetic disc 6, constructed as described above, is rotationally housed in a main controller body unit 11 obtained on a butting and interconnecting an upper cartridge half 9 and a lower cartridge half 10. In a mid portion of the lower surface of the main controller body unit 11, housing the magnetic disc 6, there is formed a circular center opening 12 into which is intruded a disc table constituting the disc rotating driving unit. In facing positions of the upper and lower surfaces of the main controller body unit 11 are formed rectangular recording/reproducing apertures 13, 14, as shown in FIGS. 2 and 3. These apertures 13, 14 are located at a mid portion in the left-and-right direction of the main controller body unit 11 and are formed for extending from the vicinity of the center opening 12 to the front surface side of the main controller body unit 11. The first magnetic disc 6, housed in the main controller body unit 11, has a portion of the signal recording portion thereof exposed to outside across the inner and outer rims of the disc. At a corner of the rear side of the main controller body unit 11 is formed a mistaken recording prohibiting opening 15 for inhibiting overwriting of information signals for the housed magnetic disc 6, as shown in FIGS. 2 and 3. In the opposite side corner to the mistaken recording prohibiting opening 15 in the lower surface of the main controller body unit 11, there is formed a disc discriminating hole 16 indicating the specifications of the magnetic disc housed in the main controller body unit 11. By detecting the disc discriminating hole 16, it can be discerned that the magnetic disc 6 housed in the main controller body unit 11 has the recording capacity of 2 MB.

In the lower side of the main controller body unit 11, there are formed positioning hole engagement holes 17, 18 for positioning pins adapted for positioning the cartridge loading position provided on the disc drive device 100 when the first magnetic disc 6 is loaded on the disc drive device 100. These positioning hole engagement holes 17, 18 are provided on both sides of the recording/reproducing apertures 13, 14, as shown in FIG. 3.

On the first magnetic disc 6, there is mounted a shutter member 19 for opening/closing the recording/reproducing apertures 13, 14, as shown in FIGS. 2 and 3. The shutter member 19 is formed by a plate of metal, such as aluminum or stainless steel, or molded from a synthetic resin, and is shaped to have a U-shaped cross-section. The shutter member 19 is fitted to the front side of the main controller body unit 11 to overlie the recording/reproducing apertures 13, 14 and is mounted for movement in the direction indicated by arrows a1 and a2 in FIGS. 2 and 3 for opening/closing the recording/reproducing apertures 13, 14. The shutter member 19 has shutter portions 19a, 19b extending on the upper and lower sides of the main controller body unit 11 for overlying the recording/reproducing apertures 13, 14. These shutter portions 19a, 19b are formed with rectangular cut-outs 20, 21 for registering with and opening the apertures 13, 14 when the shutter member 19 is moved in the direction indicated by arrow a1 in FIGS. 2 and 3.

Figure 4:
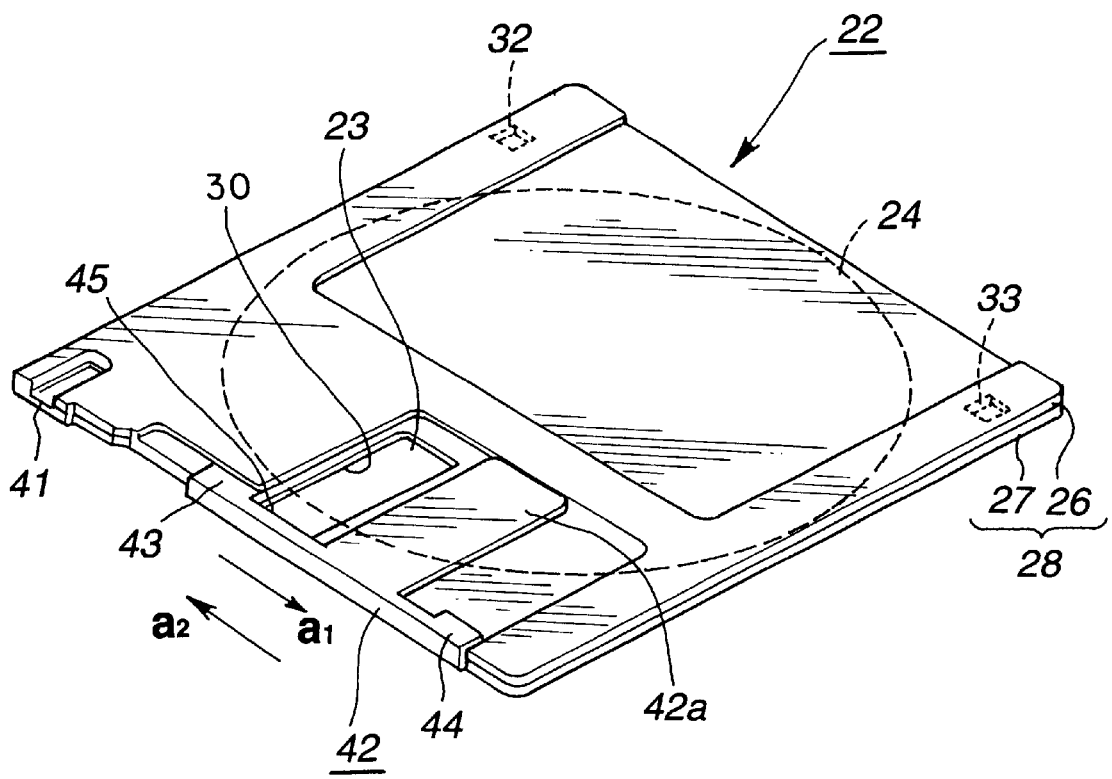
FIG. 4 is a perspective view showing a second disc cartridge applied to the disc drive device.

The shutter member 19 is biased by a spring member, not shown, provided in the main controller body unit 11, in the direction indicated by arrow a2 in FIGS. 3 and 4 in which the shutter portions 19a, 19b close the apertures 13, 14.

The second disc cartridge 22, housing the second magnetic disc 23, adapted for recording the information signals at a second recording density higher than the recording density of the first magnetic disc 6, has the size and the thickness in common with those of the above-described first disc cartridge 5.

The second magnetic disc 23, housed in the second disc cartridge 22, has a disc substrate 24 of flexible synthetic resin and forms a signal recording portion by depositing magnetic layers on both major surfaces of the disc substrate 24. The mid portion of the disc substrate 24 is formed with a circular center opening and a hub 25 is mounted in a manner of closing the center opening. The hub 25 is formed using a magnetic material, such as stainless steel or iron, and is mounted on the disc substrate 24 by fitting a tubular projection in the center opening and by bonding a flange formed on the outer rim of the projection on the rim of the center opening. The center portion of the hub 25 is formed with a rectangular spindle opening 25a into which is inserted a spindle of the disc rotating driving unit provided on the disc drive device. In an offset portion from the center portion of the hub is bored a rectangular driving pin engagement opening 25b engaged by a driving pin provided on the disc rotating driving unit.

Figure 5:
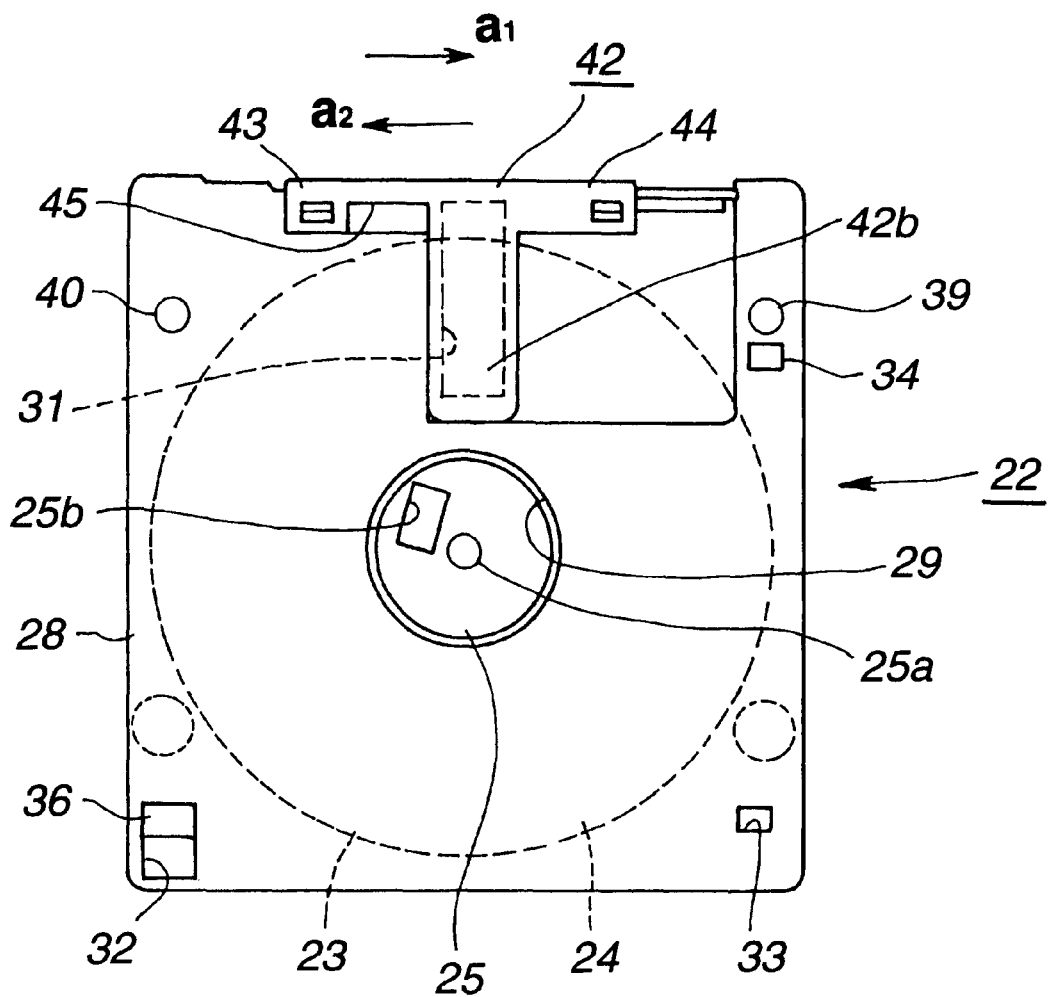
FIG. 5 is a bottom plan view showing the second disc cartridge.

The above-described second magnetic disc 23 is designed to have a recording capacity not less than 100 MB and preferably not less than 200 MB. This second magnetic disc 23 is rotationally housed in a main controller body unit 28 formed by abutting the upper and lower cartridge halves 26, 27 together and interconnecting these cartridge halves 26, 27. In a mid portion of the lower side of the main controller body unit 28, housing the second magnetic disc 23, there is formed a circular center opening 29 into which is intruded a disc table constituting the disc rotating driving unit, as shown in FIG. 4. In registering positions of the upper and lower surfaces of the main controller body unit 28, there are formed rectangular recording/reproducing apertures 30, 31, as shown in FIGS. 4 and 5. These apertures 30, 31 are formed at mid portions in the left-and-right direction of the main controller body unit 28 for extending from the vicinity of the center opening 29 towards the front side of the main controller body unit 28. The second magnetic disc 23 housed in the main controller body unit 28 has a portion of its signal recording area exposed to outside across inner and outer rims of the disc via the recording/reproducing apertures 30, 31.

Meanwhile, the second magnetic disc 23 has the signal recording area extending to the vicinity of the outer rim thereof in order to realize a high recording capacity. The recording/reproducing apertures 30, 31 are larger in size than the recording/reproducing apertures 13, 14 provided in the first disc cartridge 5 in order to permit the signal recording area formed up to the vicinity of the second magnetic disc 23 to be exposed to outside of the main controller body unit 28 for accessing by the head unit of the disc drive device 100. That is, the recording/reproducing apertures 30, 31 are formed to an enlarged size up to the vicinity of the front side of the main controller body unit 28, as shown in FIG. 4.

In the opposite side corner of the rear side of the main controller body unit 28, there is formed a mistaken recording inhibiting hole 32 for inhibiting overwriting of the information signals on the housed second magnetic disc 23, as shown in FIGS. 4 and 5. The mistaken recording inhibiting hole 32 is formed in a reverse side with respect to the first disc cartridge 5. There is movably mounted a mistaken recording inhibiting member 36. At the opposite side corner with respect to the side of the lower side of the main controller body unit 28 provided with the mistaken recording inhibiting hole 32, there is provided a detection hole 33, as shown in FIG. 5. This detection hole 33 is provided in register with the mistaken recording prohibiting opening 15 of the first disc cartridge 5 and, if the main controller body unit 28 is loaded on the disc drive device 100 dedicated to the first disc cartridge 5, the detection hole 33 is detected by the mistaken recording inhibiting mechanism provided on the disc drive device 100 to inhibit recording of information signals on the second magnetic disc 23 to prevent inadvertent erasure of information signals recorded to a high recording density on the second magnetic disc 23.

In the lower side of the main controller body unit 28, there are provided positioning pin engagement holes 39, 40 for setting the second disc cartridge 22 in position at the cartridge loading position provided on the disc drive device 100 on loading the second disc cartridge 22 on the device 100. These holes 39, 40 are formed on both sides of the recording/reproducing apertures 30, 31, as shown in FIG. 5. In the lower surface of the main controller body unit 28, there is formed a disc capacity discriminating hole 34, in adjacency to the positioning pin engagement hole 39, for indicating that the second magnetic disc 23 housed in the main controller body unit 28 and which has a high recording capacity of, for example, 200 MB, has been loaded on the disc drive device 100.

At a corner of the front side of the upper surface of the main controller body unit 28 provided with the recording/reproducing apertures 30, 31, there is provided a mistaken insertion inhibiting groove 41 for controlling the direction of insertion of the main controller body unit into the disc drive device 100.

Similarly to the first disc cartridge 5, the second disc cartridge 22 carries a shutter member 42 adapted for opening/closing the recording/reproducing apertures 30, 31. This shutter member 42 is formed by a plate of metal, such as aluminum or stainless steel, or by molding synthetic resin.

The shutter member 42, provided on the second disc cartridge 22, has shutter portions 42a, 42b of the size large enough to close the recording/reproducing apertures 30, 31. These shutter portions 42a, 42b are interconnected by shutter supporting portions 43, 44 of the U-shaped cross-section protuberantly formed from both sides of the proximal ends of the shutter portions 42a, 42b to present a substantially T-shaped plan configuration.

Meanwhile, the recording/reproducing apertures 30, 31, provided in the second disc cartridge 22, are formed to the vicinity of the front side surface of the main controller body unit 28, in order to permit the signal recording area, formed in the vicinity of the outer rim of the second magnetic disc 23, to outside the main controller body unit 23, and are sized to be larger than the recording/reproducing apertures 13, 14 provided in the first disc cartridge 5. For reliably opening the large-sized recording/reproducing apertures 30, 31, there is provided, in one of the shutter supporting portions 43 of the shutter member 42, a cut-out recess 45 for opening the apertures 29, 30 towards the front side of the main controller body unit 28 when the shutter member 42 has been moved to the position of opening the front side of the main controller body unit 28. That is, the cut-out recess 45 is formed in the portion of the shutter supporting portion 43 extending on the upper and lower sides of the main controller body unit 28.

The above-described shutter member 42 is mounted for movement in the direction indicated by arrows a1 and a2 in FIGS. 4 and 5 in which the shutter portions 42a, 42b open or close the apertures 30, 31, by the shutter member 42 being fitted from the front side of the main controller body unit 28 to overlie the recording/reproducing apertures 30, 31.

Meanwhile, the shutter member 42 is biased by a spring, not shown, provided in the main controller body unit 28, for movement in the direction indicated by arrow a2 in FIGS. 4 and 5 in order for the shutter portions 42a, 42b to close the recording/reproducing apertures 30, 31.

The disc drive device 100 according to the present invention, enabling recording/reproduction of information signals selectively using a first disc cartridge 5 housing the first magnetic disc 6 of the first recording density or the second disc cartridge 22 housing the second magnetic disc 23 of the second recording density higher than the first recording density, is hereinafter explained with reference to the drawings.

Figure 6:
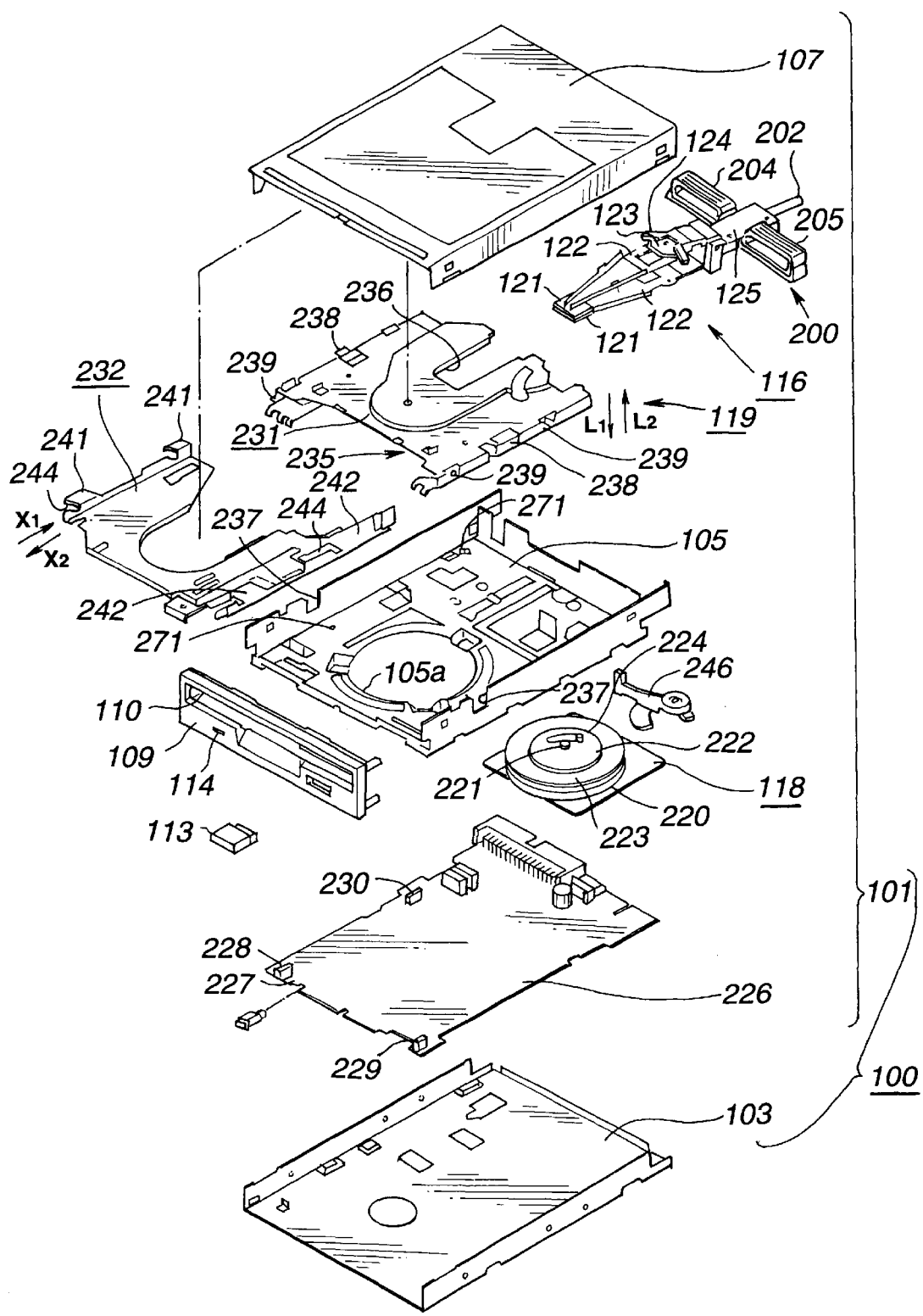
FIG. 6 is an exploded perspective view showing the disc drive device.

The disc drive device 100 includes a main body portion 101, in which to load a disc cartridge, and a mounting base 103 operating as a lower cover for protecting the bottom side of the main body portion 101 and adapted for mounting the main body portion 101 in a receiving portion in the casing of, for example, a computer, as shown in FIGS. 1 and 6.

The main body portion 101 includes a base 105, formed by a metal plate or aluminum diecast, an upper cover 107 for protecting the inner portion of the base member 105 and a front panel 109 having a cartridge entrance/exit opening 10 for insertion or ejection of the first and second disc cartridges 5, 22, as shown in FIGS. 1 and 6.

The upper cover 107 is formed by bending a metal sheet to a substantially U-shaped cross-section and is mounted on the upper end of the base 105.

The front panel 109 is formed of, for example, synthetic resin, and is detachably mounted on the base member 106. In the upper edge of the front panel 109, there is formed a cartridge entrance/exit opening 110 sized to be large enough to permit insertion therein of the first and second disc cartridges 5, 22 in the horizontal direction with the front side end carrying the shutter members 19, 42 as the inserting end. The cartridge entrance/exit opening 10 is closed by an opening/closure door 112 rotated towards the inner side of the main body portion 101 when the first or second disc cartridge 5, 22 has not been loaded in the main body portion 101.

On both sides of the lower edge of the front panel 109, there are provided an ejection button 113 for actuating an ejection mechanism, not shown, for ejecting the first or second disc cartridge 5, 22 loaded in the main body portion 101 from the inside of the main body portion 101, and a lighting indicating unit 114 for indicating the operating state of the disc drive device 100.

Referring to FIG. 6, the main body portion 101 of the disc drive device 100 includes a head unit 116 for recording/reproducing information signals for the first or second magnetic disc 6, 23 housed in the first or second disc cartridge 5, 22, a movement unit 117 for causing radial movement of the head unit 116 in a direction radially of the first or second magnetic disc 6, 23, a disc rotating driving unit 118 for rotationally driving the first or second magnetic disc 6, 23 and a loading unit 119 for transferring the first or second disc cartridge 5, 22 to the cartridge loading position of recording/reproducing the first or second disc cartridge 5, 22.

The head unit 116 is arranged on the base member 105 in the main body portion 101 for movement in the direction along the radius of the first or second magnetic disc 6, 23 via the movement unit 117 to a position facing the first or second disc cartridge 5, 22 loaded in the main body portion 101.

Figure 7:
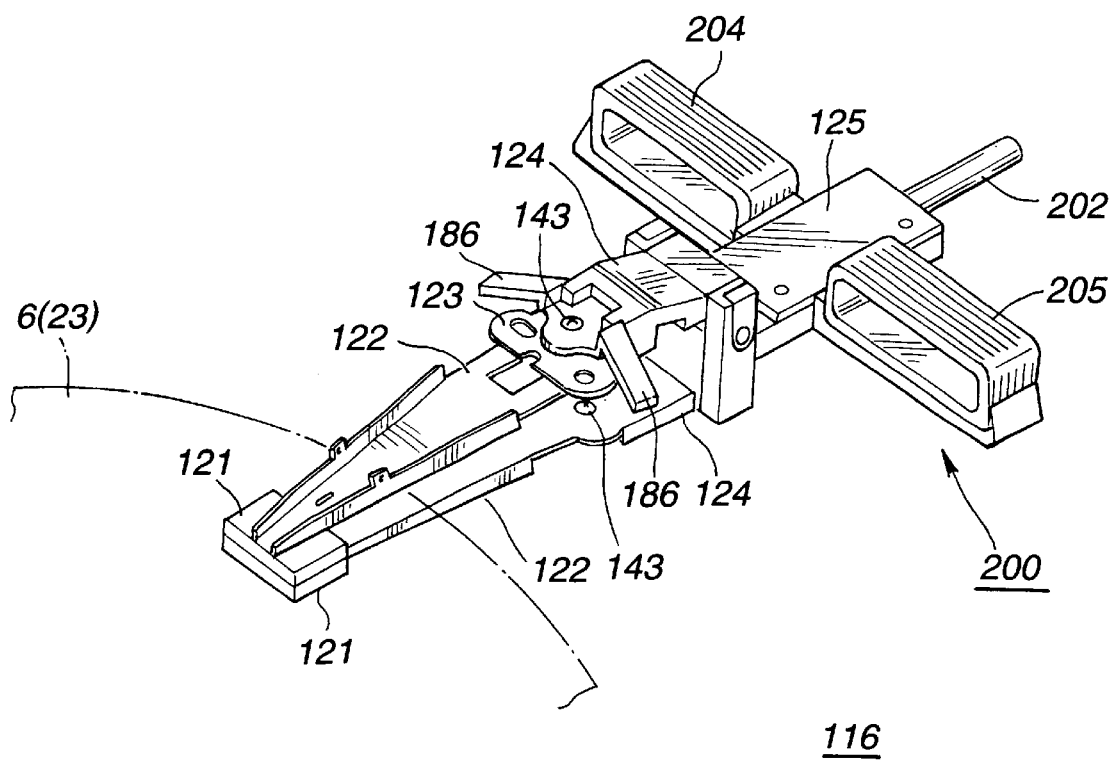
FIG. 7 is a perspective view showing a head unit of the disc drive device.

Referring to FIGS. 6 and 7, the head unit 116 includes head portions 121, 121 for recording/reproducing information signals in association with the mutually different first and second recording densities, supporting arms 122, 122 carrying the head portions 121, 121, base plates 123, 123 arranged at the proximal ends of the supporting arms 122, 122, arm holding portions 124, 124 holding the supporting arms 122, 122 via the base plates 123, 123 and a main head carriage member 125 carrying the arm holding portions 124, 124.

The head portions 121, 121 are arranged on both sides of the major surfaces of the first or second magnetic disc 6, 23 and includes a head slider, a gimbal spring for oscillatably supporting the head slider and a spacer carrying the gimbal spring, although these components are not shown. The head slider has first and second magnetic head elements for recording/reproducing information signals in association with the one of the different first and second recording densities, although these head elements also are not shown.

The head slider includes a first magnetic head element for recording/reproducing information signals in association with the first recording density, a second magnetic head element for recording/reproducing information signals in association with the second recording density, a coil constituting the magnetic circuit and a magnetic core forming member. The gimbal spring is formed by a thin metal plate and is formed at a mid portion thereof with a resilient head supporting portion. The gimbal spring oscillatably supports the head slider via head supporting portion. The spacer is formed to a substantially rectangular tubular shape and carries a pivot in its inside abutted against the head supporting portion of the gimbal spring. On one end of the spacer is formed a mounting portion for mounting the outer rim of the gimbal spring. The other end of the spacer is mounted on the foremost part of the supporting arm 122.

Figure 8:
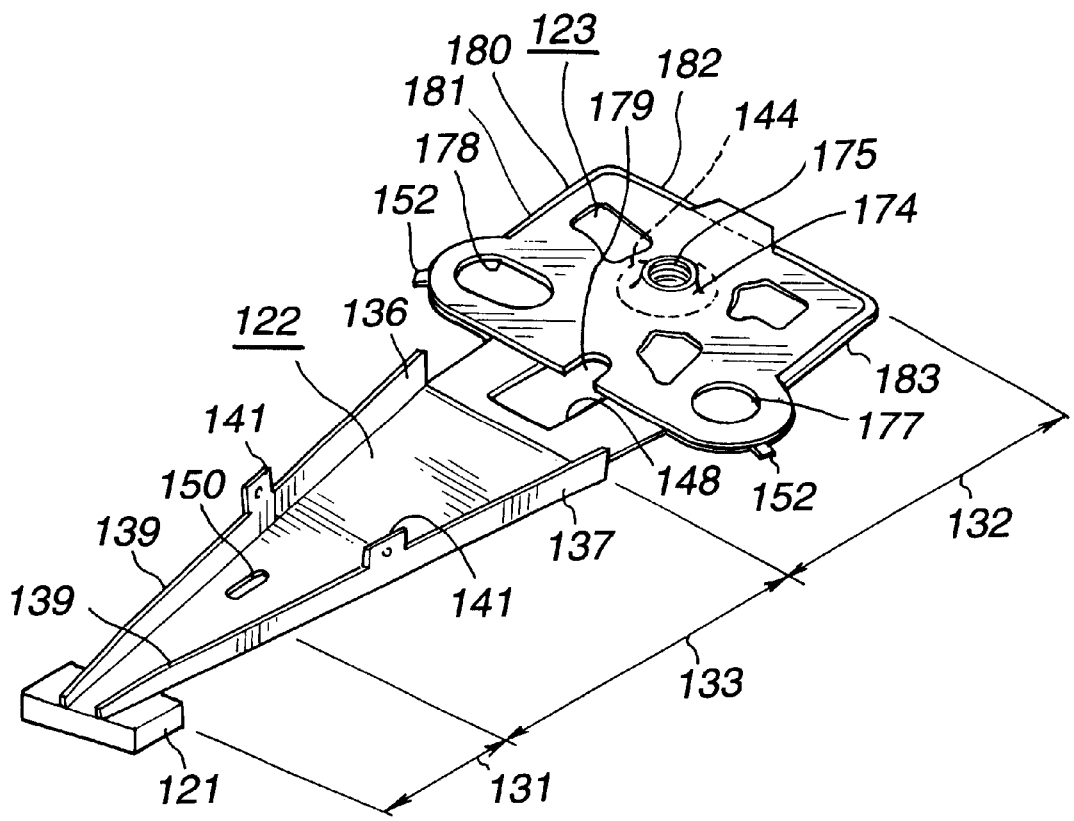
FIG. 8 is a perspective view showing a supporting arm and a base plate of the head unit.
Figure 9:
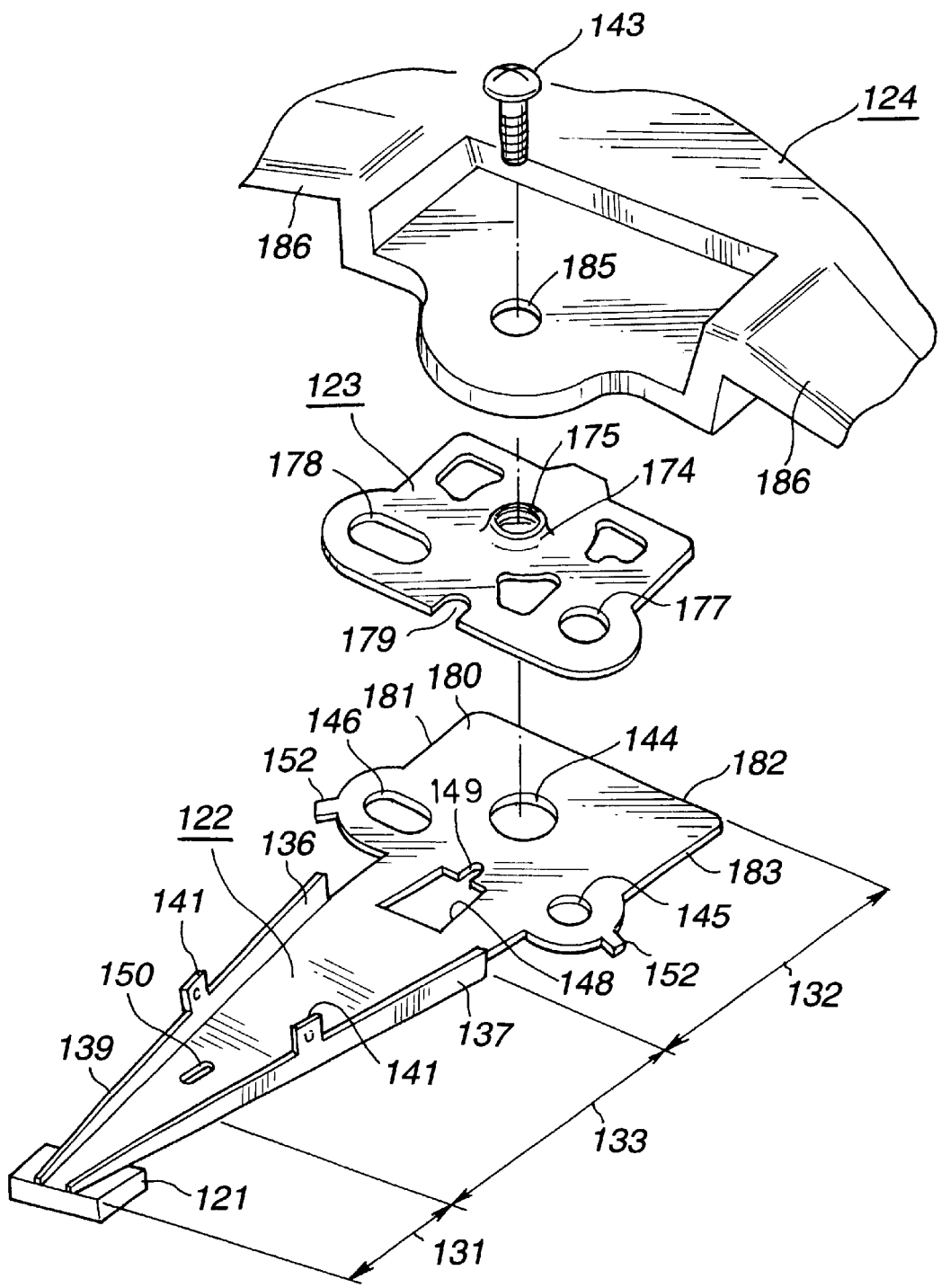
FIG. 9 is an exploded perspective view showing the supporting arm and the base plate of the head unit.
Figure 10:
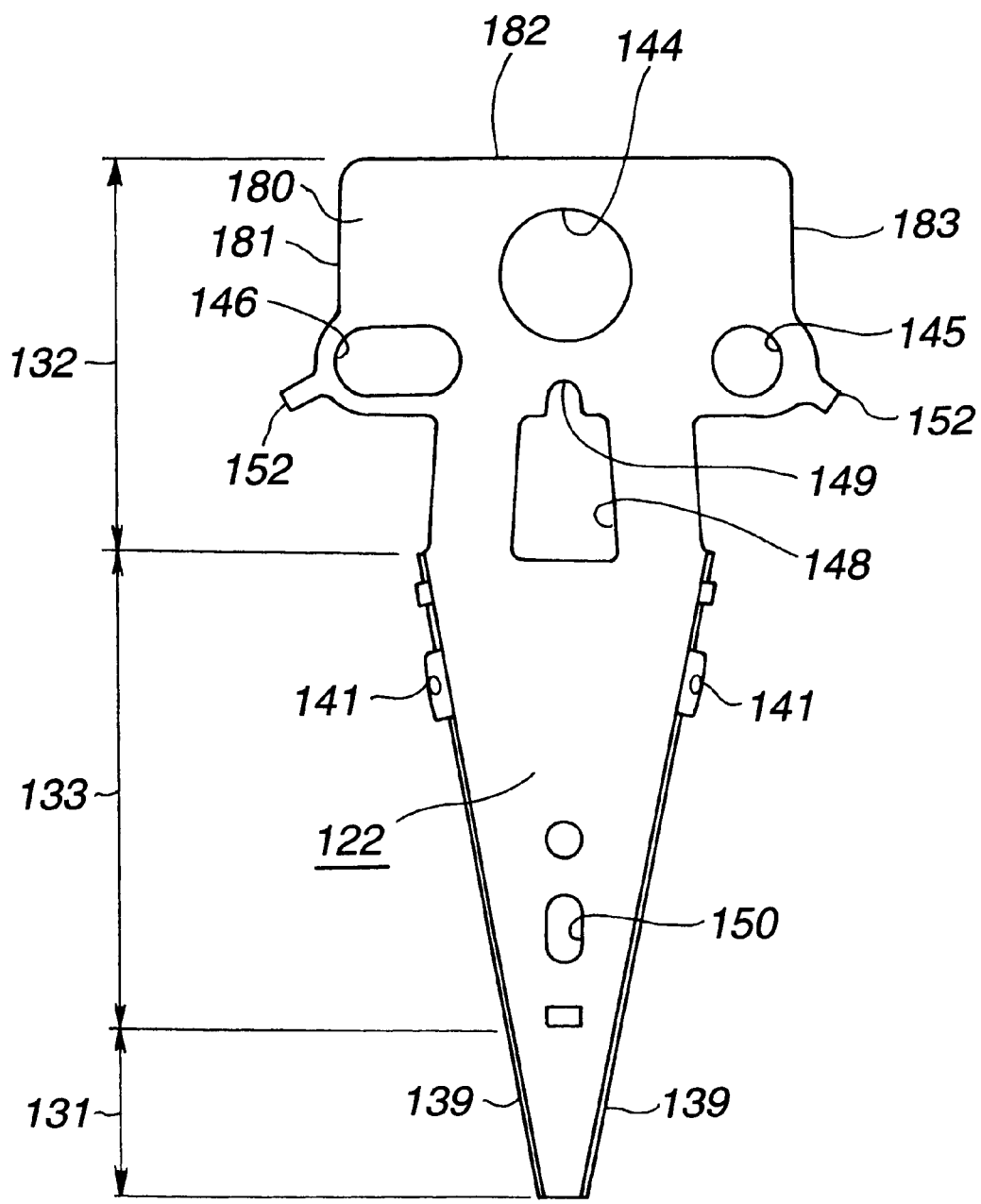
FIG. 10 is a plan view of the supporting arm.

The supporting arm 122 is formed by a thin metal sheet and includes a first portion 131 towards its distal end carrying the head portion 121, a second portion 132 on its proximal side carrying the base plate 123, and a third portion 133 interconnecting the first and second portions 132, as shown in FIGS. 8 to 10. These first to third portions 131 to 133 are of different shapes from one another so as to give different physical properties in order for the first to third portions 131 to 133 to follow up with the first or second magnetic disc 6, 23 in a desired slide contact or floating state.

The first portion 131 is contoured so as to take into account the toughness of the supporting arm 122 around the axis parallel to the longitudinal direction of the supporting arm 122, referred to below as the pitching direction, in order to optimize the initial attitude of the supporting arm 122 with respect to the first or second magnetic disc 6, 23.

The second portion 132 is contoured so as to take into account the toughness necessary to realize a desired value of the gap between the head slider of the head portion 121 and the signal recording surface of the second magnetic disc 23 at the time of recording/reproduction of the second magnetic disc 23, in order to optimize the follow-up characteristics of the head portion 121 with respect to the second magnetic disc 23.

The third portion 133 is contoured so as to take into account the toughness of the supporting arm 122 around the axis parallel to the width-wise direction of the supporting arm 122, referred to below as the rolling direction, in order to realize a structure for possibly evading resonance with vibrations generated by spindle motor of the disc rotating driving unit 119 as later explained and the electromagnetic driving unit of the movement unit 117.

The supporting arm 122 is tapered, that is, is shaped so that the first to third portions 131 to 133 are progressively reduced in width in a direction towards its distal end, as shown in FIGS. 9 and 10. The supporting arm 122 is formed with bent pieces 136, 137 for extending along the longitudinal direction of the first to third portions 131 to 133. The bent pieces are bent from the major surface on both width-wise sides of the arm 122, as shown in FIG. 9.

Figure 11:
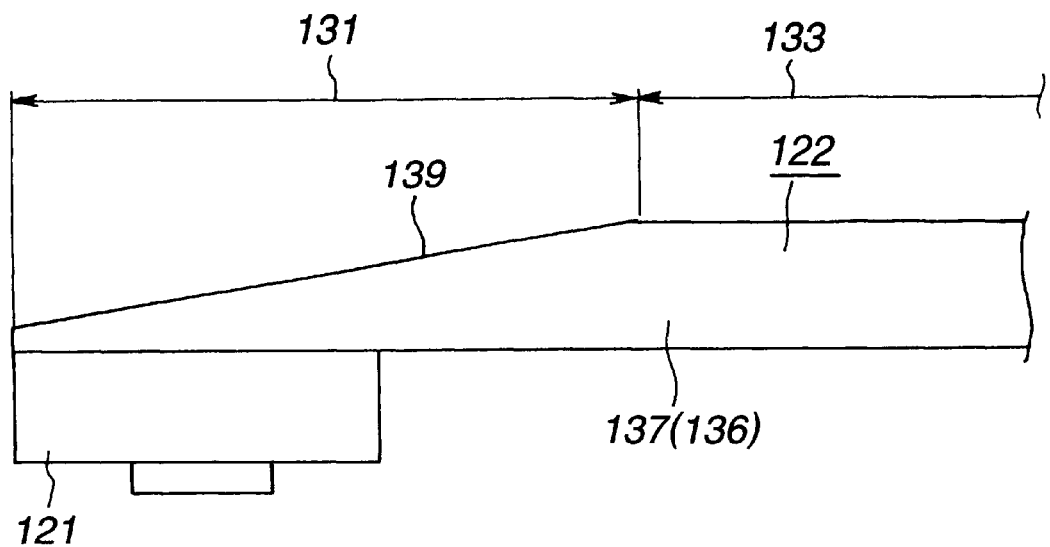
FIG. 11 is a side view showing the shape of the first portion of the supporting arm.

The bent pieces 136, 137 of the first portion 131 of the supporting arm 122 are formed with an inclined portion 139 in which the bent heights of the bent pieces 136, 137 with respect to the major surface become progressively smaller towards the distal end, as shown in FIG. 11.

Figure 12:
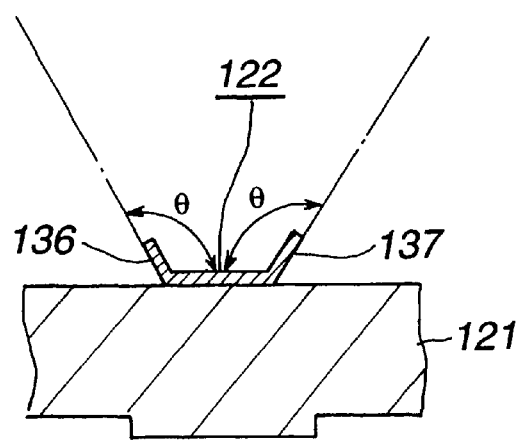
FIG. 12 is a longitudinal cross-sectional view for illustrating a bent piece of the supporting arm.

The bent pieces 136, 137 of the supporting arm 122 are inclined with respect to the major surface of the supporting arm 122, as shown in FIG. 12. The angle of inclination with respect to the major surface is obtuse, and is, for example, 100.

The bent pieces 136, 137 are formed with mounting pieces 141 for carrying both ends of a supporting shaft lifted by a head lift unit, not shown, for moving the head portion 121 towards or away from the signal recording surface of the first or second magnetic disc 6, 23.

In the second portion 132 of the supporting arm 122, there is bored an insertion hole 144 for a set screw 143 used for securing the supporting arm 122 to the arm holding member 124. On both sides of the insertion hole 144, on both width-wise sides, there are bored a positioning reference hole 145 and a positioning guide hole 146 for setting the mounting position with respect to the base plate 123. In these positioning reference hole 145 and the positioning guide hole 146, a positioning reference pin and a positioning guide pin, not shown, are inserted for positioning the supporting arm 122 relative to the base plate 123.

In the second portion 132 of the supporting arm 122 is bored an opening 148 adjacent to the third portion 133, as shown in FIG. 10. In an edge portion of the opening 148, there is formed a positioning reference groove 149 for setting the mounting position along the longitudinal direction of the supporting arm 122 when securing the supporting arm 122 to the base plate 123. This positioning reference groove 149 is formed in position on the width-wise centerline of the supporting arm 122. The third portion 133 of the supporting arm 122 is formed with a positioning guide opening 150 for guiding the mounting position of the supporting arm 122 relative to the longitudinal direction.

On the first portion 131 of the supporting arm 122, there is mounted in position the head portion 121 on the surface thereof facing the signal recording surface of the first or second magnetic disc 6, 23. Referring to FIG. 11, the head portion 121 is arranged towards the distal end of the first portion 131 carrying the inclined portion 139. At a corner of the second portion 132, there are protuberantly formed supporting pieces 152, 152 for supporting the mid portions of a jumper wire, not shown, connected to the head portion 121, as shown in FIG. 10.

In the above-described supporting arm 122, the inclined portion 139 is formed on the bent pieces 136, 137 of the first portion 131. Alternatively, the supporting arm may also be configured as shown for example in FIGS. 13 and 14.

Figure 13:
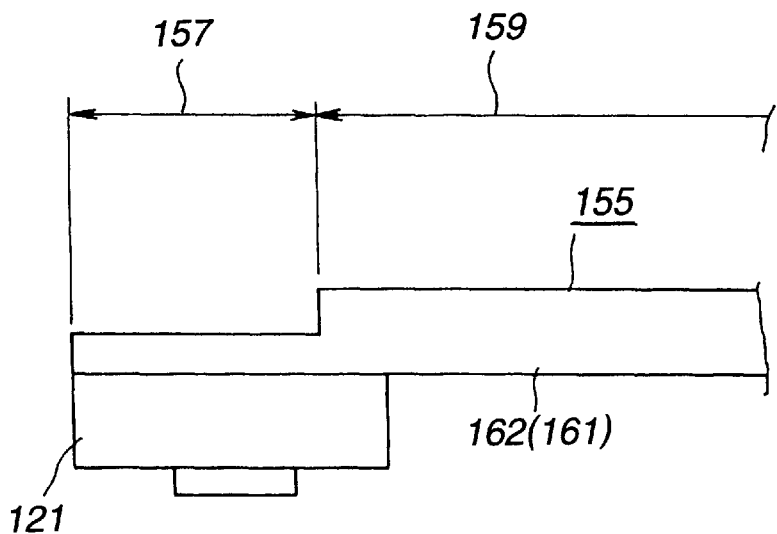
FIG. 13 is a side view showing an alternative shape of the first portion of the supporting arm.

Similarly to the supporting arm 122, describe above, a supporting arm 155 has a first portion 157, a second portion, not shown, and a third portion 159, with a bent piece 161 of the first portion 157 and a bent portion 162 of the third portion 159 differing from each other in the bending heights. That is, the bending height of the first portion 157 is lower than that of the first portion 157, as shown in FIG. 13. Also, the longitudinal size of the first portion 157 is smaller than the width of the head portion 121 parallel to the track width direction, as also shown in FIG. 13. Stated differently, the head portion 121 is mounted astride the first and third portions 157, 159.

Figure 14:
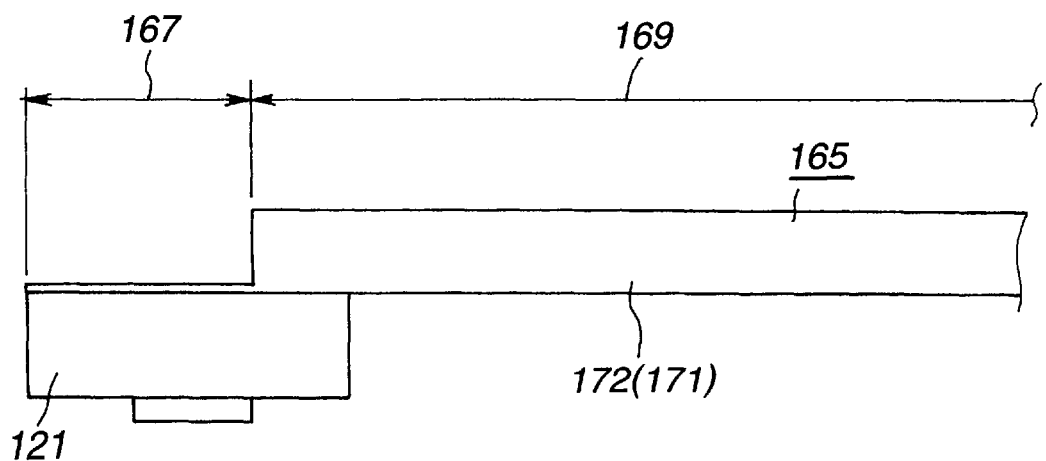
FIG. 14 is a side view showing a still alternative shape of the first portion of the supporting arm.

Referring to FIG. 14, a supporting arm 165 includes a first portion 167, a second portion, not shown, and a third portion 169, although these portions are not explained specifically. These portions are provided with bent pieces 171, 172, first portions of which are cut out, with the first portion 167 being in a flat plate shape. Referring to FIG. 14, the longitudinal size of the first portion 167 is smaller than the width of the head portion 121 parallel to the track width direction. Stated differently, the head portion 121 is mounted astride the first portion 167 and the third portion 169.

By optionally changing the bending height of the bent pieces of the supporting arm, it is possible to optimize characteristics of the entire supporting arm with respect to the bending resonance or torsional resonance.

On the outer rim of the second portion 132 of the supporting arm 122, there is formed a positioning reference unit 180 for setting the mounting position of the supporting arm 122 relative to the arm holding member 124 when mounting the supporting arm 122 on the arm holding member 124, as shown in FIGS. 8 to 10. This positioning reference unit 180 includes sides 181 to 183 operating as abutting reference for a positioning abutment pin, not shown.

In the above-described supporting arm 122, a substantially rectangular opening 148 is provided in the third portion 132. The shape of other openings provided in the supporting arm is hereinafter explained. The same parts as those of the above-described supporting arm 122 are denoted by the same reference numerals andare not explained specifically.

Figure 15:
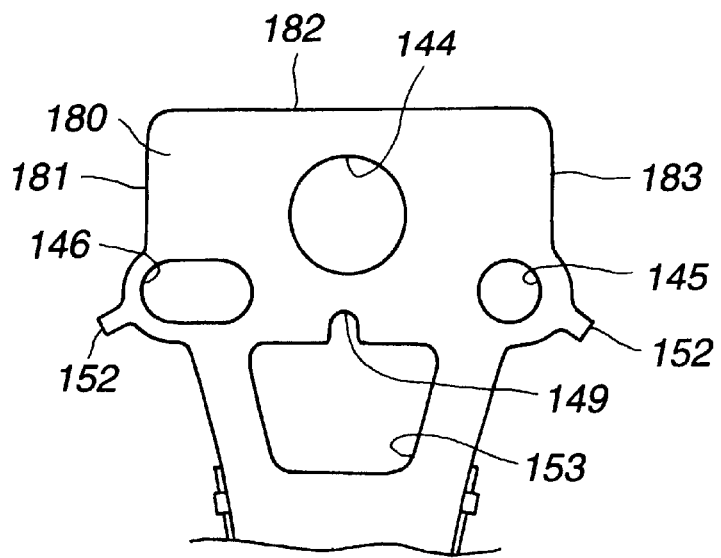
FIG. 15 is a plan view showing the shape of another opening provided in the supporting arm.
Figure 16:
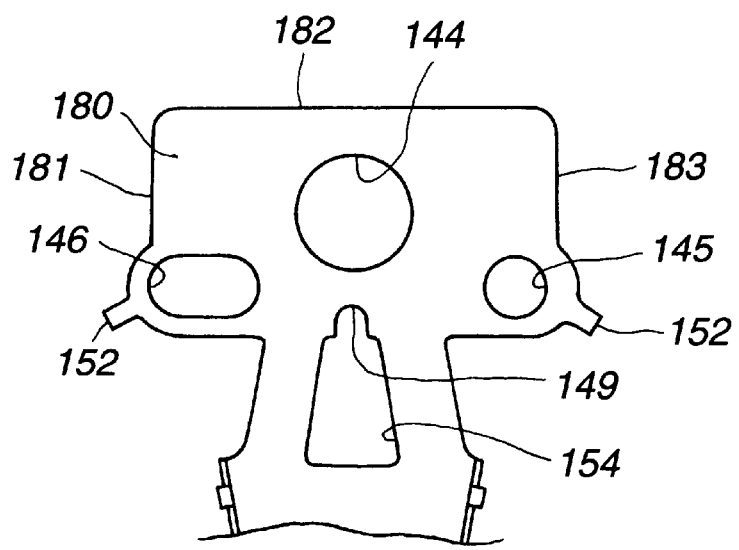
FIG. 16 is a plan view showing the shape of still another opening provided in the supporting arm.

Referring to FIG. 15, there is provided an opening 153, the opening width of which parallel to the width-wise direction of the supporting arm is increased progressively from the third portion side towards the second portion side. The opening 153 is rounded accurately at respective corners to prevent stress concentration therein. Referring to FIG. 16, the second portion of the supporting arm is formed with an opening 154, the opening width of which parallel to the width-wise direction of the supporting arm is progressively decreased from the third portion side towards the second portion side. The opening 153 also is rounded accurately at respective corners to prevent stress concentration therein.

By optionally selecting the size or the shape of the openings, such as the openings 153, 154, provided in the supporting arm, the orientation or the width of the connecting pieces constituting the connecting portion interconnecting the second and third portions can be changed to adjust the physical properties of the second portion, such as toughness, to a desired value.

The base plate 123 is formed to a flat plate shape from a metallic material, and is bonded by, for example, laser spot welding, to a pre-set position on the second portion 132 of the supporting arm 122, as shown in FIG. 8.

Figure 17:
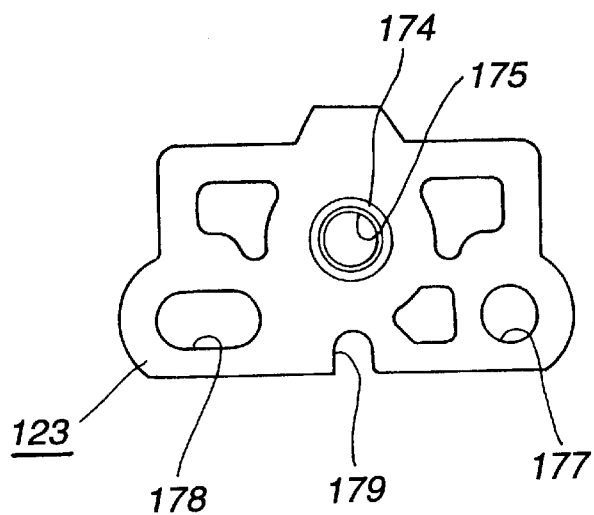
FIG. 17 is a plan view showing the base plate.

The base plate 123 is formed with a flange 174 having a tapped hole 175 engaged by a set screw 143 for mounting the base plate with adjusted movement to the arm holding member 124, as shown in FIGS. 9 and 17. With this flange 174, the position of the head portion 121 mounted on the supporting arm 122 with respect to the first or second magnetic disc 6, 23 can be moved via the set screw 143 and the flange 174 by way of achieving fine position adjustment.

In the base plate 123, there are bored a positioning reference hole 177 and a positioning guide hole 178 on both sides of the flange 174 for setting the mounting position with respect to the supporting arm 122, as shown in FIGS. 9 and 17. The positioning reference hole 177 and the positioning guide hole 178 are passed through by the positioning reference pin and a positioning guide pin of a mounting jig, not shown, by way of achieving the positioning.

On the outer rim of the base plate 123, there is formed a positioning reference groove 179, on the centerline along the width of the supporting arm 122, used for setting the mounting position along the longitudinal of the supporting arm 122 when mounting the base plate on the second portion 132 of the supporting arm 122, as shown in FIG. 17. This positioning reference groove 179 is formed in register with the positioning reference groove 149 formed in the supporting arm 122.

Figure 18:
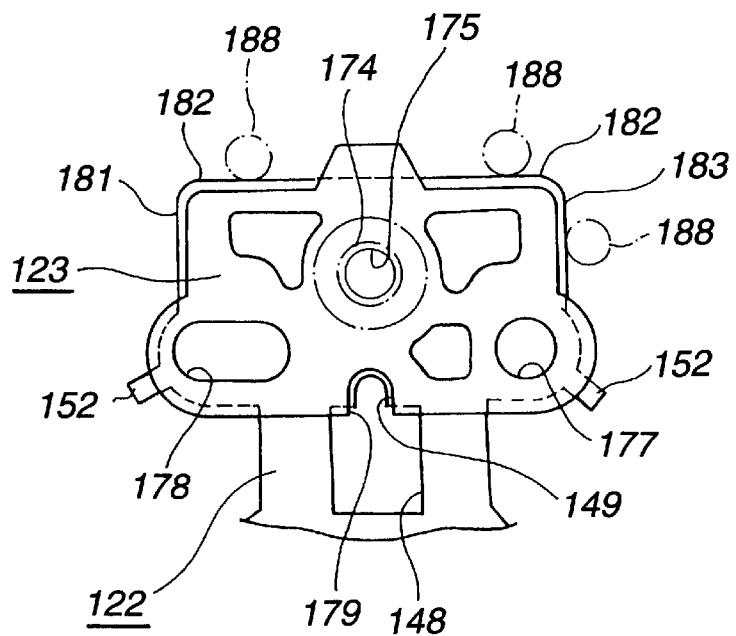
FIG. 18 is a plan view showing a positioning reference unit for the base plate.

The outer rim of the base plate 123 is dimensioned so that, with the base plate 123 mounted on the second portion 132 of the supporting arm 122, the respective sides 181 to 183 of the positioning reference unit 180 of the second portion 132 of the supporting arm 122 are protruded slightly from the outer rim of the base plate 123. The sides 181 to 183 of the positioning reference unit 180 of the supporting arm 122 are protruded a distance of, for example, 0.1 mm, from the outer rim of the base plate 123, as shown in FIGS. 8 and 18.

The arm holding member 124 is formed of a tough material, and has a tapped hole 185 into which is threaded a set screw 143 for securing the supporting arm 122 and the base plate 123. The arm holding member 124 includes guide pieces 186, 186 for guiding the movement of the head portions 121, 121 by having sliding contact with the upper surface of the cartridge holder of a loading unit 119, as later explained, as shown in FIGS. 6 and 7. On the arm holding member 124 is mounted the base plate 123. The main head carriage member 125 is formed to a substantially U-shaped cross-section, from a tough material, and is supported for movement by the movement unit 117.

The method for mounting the above-described base plate 123 in position on the second portion 132 of the supporting arm 122, and the method for mounting the supporting arm 122 carrying the base plate 123 in position on the arm holding member 124 are hereinafter explained.

After mounting the head unit 121 on the supporting arm 122, the base plate 123 is first mounted on the supporting arm 122 via a mounting jig, not shown. The supporting arm 122 is positioned by the positioning guide pin and the positioning reference pin mounted on the mounting jig being inserted through the positioning reference hole 146 and the positioning guide hole 145. The supporting arm 122 is set on the mounting jig by the positioning guide shaft set upright on the mounting jig being inserted through the positioning guide hole 150 and by the positioning reference shaft set upright on the mounting jig compressing against the positioning reference groove 149.

By the positioning guide pin and the positioning reference pin of the mounting jig being inserted into the positioning guide hole 178 and the positioning guide hole 177 and by the positioning reference shaft compressing against the positioning reference groove 179 of the base plate 123, the base plate 123 is set on the supporting arm 122, set on the mounting jig, in position with respect to the longitudinal direction of the supporting arm 122, such that the base plate 123 is fixedly connected to the second portion 132 of the supporting arm 122. Thus, the base plate 123 is mounted to high precision with respect to the longitudinal direction of the supporting arm 122.

When the supporting arm 122 carrying the base plate 123 is mounted on the arm holding member 124, three abutment pins 188 set on the mounting jig are abutted at three points on the sides 182, 183, operating as reference for the positioning reference unit 180 of the second portion 132, as shown in FIG. 18. In a manner not shown, the supporting arm 122, carrying the base plate 123, is abutted as described above by the force of the biasing pins being inserted into the positioning guide holes 145, 177 or the positioning guide holes 146, 178 of the supporting arm 122 or the base plate 123. The biasing pins bias the abutment pins 188 against the sides 182, 183 of the positioning reference unit 180. The biasing force of the biasing pin acts on the supporting arm 122 in substantially the diagonal direction of the corners of the second portion 132.

Thus, the supporting arm 122 and the base plate 123 can be mounted to high precision on the arm holding member 124 by positioning the supporting arm 122 carrying the head unit 121 at three points as reference positions when mounting the supporting arm 122 and the base plate 123 on the arm holding member 124.

Finally, adjustment guide pins, not shown, are inserted into the positioning guide holes 145, 177 and into the positioning guide holes 146, 178 of the supporting arm 122 and the base plate 123 and a set screw 143 threaded into the tapped hole 175 of the flange 174 of the base plate 123 is adjusted finely, to adjust the fixing direction of the base plate 123 with respect to the arm holding member 124. Thus, with the supporting arm 122, carrying the base plate 123, it is possible to set the position of the head unit 121 with respect to the first or second magnetic disc 6, 23 to high precision and to secure the base plate 123 to the arm holding member 124 by the set screw 143 easily and reliably.

With the head unit 116, having the head units 121, 121, as described above, it is thus possible to record/reproduce the information signals for the first magnetic disc 6 adapted for recording information signals at a first recording density and for the second magnetic disc 23 adapted for recording information signals at a second recording density higher than the first recording density.

For recording/reproducing information signals for the first magnetic disc 6, the first magnetic disc 6 is run in rotation, with the first magnetic head elements of the head portions 121, 121 mounted on the respective supporting arms 122, 122 in contact with the signal recording surface of the first magnetic disc 6. The first magnetic disc 6 is run in rotation at approximately 300 rpm by the disc rotating driving unit 118 for recording/reproducing information signals by the first magnetic head elements.

For recording/reproducing information signals for the second magnetic disc 23, the second magnetic head elements of the head units 121, 121 are slightly floated from the signal recording surface of the second magnetic disc 23. That is, if it is detected that the second magnetic disc 23 has been loaded in position, the disc rotating driving unit 118 rotationally drives the second magnetic disc 23 at approximately 3600 rpm. If the second magnetic disc 23 is rotationally driven at this elevated speed, there is generated air convection between the surface of the head slider facing the signal recording surface of the second magnetic disc 23 and the signal recording surface of the second magnetic disc 23 to form a so-called air film. By the operation of this air film, the head portions 121, 121 are slightly floated from the signal recording surface of the second magnetic disc 23 a fixed distance of say approximately 50 nm. The second magnetic head element records/reproduces information signals for the second magnetic disc 23 as the head portions 121, 121 are slightly floated from the signal recording surface.

Referring to FIG. 6, the movement unit 117 includes a main guide shaft 202 and a follower shaft, not shown, mounted on the base member 105 to movably support the main head carriage member 125 of the head unit 116, and an electromagnetic driving unit 200 for causing movement of the head portions 121, 121 of the head unit 116 in the direction along the radius of the first or second magnetic disc 6, 23 via the main head carriage member 125. The electromagnetic driving unit 200 includes driving coils 204, 205 inserted into the yoke of a voice coil motor, not shown. By the driving current being supplied to the driving coils 204, 205, the electromagnetic driving unit 200 is moved in the direction along the radius of the first or second magnetic disc 6, 23 loaded on a disc table 222.

Referring to FIG. 6, the disc rotating driving unit 118 includes a spindle motor 220, mounted on the base member 105, and the disc table 222 mounted on the distal end of spindle 221 of the spindle motor 220 for rotation in unison with the spindle 221. On the setting surface of the disc table 222 for the first or second magnetic disc 6, 23, there is mounted a magnet 223 for sucking the hubs 8, 25 mounted on the first or second magnetic disc 6, 23, respectively. On the setting surface of the disc table 222 for the first or second magnetic disc 6, 23, there is mounted, at a position offset with respect to the spindle 221, a driving pin 224 engaged or inserted in the driving pin engagement opening 8b or the driving pin insertion opening 25b formed in the hubs 8, 25. The driving pin 224 is biased towards the outer rim of the disc table 222 by a biasing member, such as a tension spring, not shown.

On the lower surface of the base member 105, there is mounted an electronic circuit board 226 carrying a variety of electronic circuits, detection switches, etc. On this electronic circuit board 226, a disc-in detection switch 227 for detecting the possible loading of the first or second disc cartridge 5, 22 is arranged so that the actuator operated for thrusting is protruded on the upper surface of the base member 105, as shown in FIG. 6. On the electromagnetic driving unit 200, there are also mounted a first mistaken recording inhibition detection switch 228 or a second mistaken recording inhibition detection switch 229 for detecting the opening state of the mistaken recording inhibiting holes 16, 32 provided in the first or second disc cartridge 5, 22. Referring to FIG. 6, a disc capacity detection switch 230 for detecting the disc capacity discriminating hole 34 provided in the second disc cartridge 22. This disc capacity detection switch 230 detects the possible presence of the disc capacity discriminating hole provided in the disc cartridge loaded on the cartridge loading position to detect the capacity of the magnetic disc housed in the disc cartridge.

Referring to FIG. 6, the loading unit 119 includes a cartridge holder 231 for holding the first or second disc cartridge 5, 22, loaded via the cartridge entrance/exit opening 110, and a lift plate 232 for lifting/lowering the cartridge holder 231 between a cartridge entrance/exit position for introducing or removing the first or second disc cartridge 5, 22 and a cartridge loading position for setting the cartridge holder 231 on the disc table 222 of the disc rotating driving unit 118.

The cartridge holder 231, holding the first or second magnetic disc 6, 23 inserted into the main body portion 101 via the cartridge entrance/exit opening 110, is moved in the up-and-down direction, between the cartridge introducing/removing position spaced apart from the disc table 222 of the disc rotating driving unit 118 and the cartridge loading position proximate to the disc table 222, by the lift plate 232 mounted on the base member 105. This cartridge holder 231 loads the first or second magnetic disc 6, 23 held in the first or second disc cartridge 5, 22 on the disc table 222 or unloads thee first or second magnetic disc 6, 23 loaded on the disc table 222.

The cartridge holder 231, holding the first or second magnetic disc 6, 23 inserted into the main body portion 101 via the cartridge entrance/exit opening 110, is moved in the up-and-down direction, between the cartridge introducing/removing position spaced apart from the disc table 222 of the disc rotating driving unit 118 and the cartridge loading position proximate to the disc table 222, by the lift plate 232 mounted on the base member 105. This cartridge holder 231 loads the first or second magnetic disc 6,23 held in the first or second disc cartridge 5,22 on the disc table 222 or unloadstge first or second magnetic disc 6, 23 loaded on the disc table 222.

On the upper side of the base member 105, there is mounted a lift plate 232 between the base member 105 and the cartridge holder 231 for lifting/lowering the cartridge holder 231 in a direction towards and away from the disc rotating driving unit 118 arranged on the base member 105. On both opposite sides of the lift plate 232 are upstandingly formed cam pieces 241, 242 having inclined grooves 244 extending in the up-and-down direction. In the inclined grooves 244 of the cam pieces 241, 242 are movably engaged supporting shafts 239 protuberantly formed on both sides of the cartridge holder 231.

The lift plate 232 is biased into movement by a biasing member, not shown, in the direction indicated by arrow x2 in FIG. 6. On the rear side of the base member 105 is rotationally mounted a lock lever 246 for locking the lift plate 232 in the rearwardly shifted position when the lift plate 232 is moved rearwards in the direction indicated by arrow x1 in FIG. 6.

On the rear side on the base member 105, there is mounted an ejection motor of an ejection mechanism adapted for moving the lift plate 232 in the direction indicated by arrow x1 in FIG. 6 against the bias of the biasing member.

When the first or second disc cartridge 5, 22 is enabled to be inserted into or detached from the main body portion 101 via the cartridge entrance/exit opening 110, the lift plate 232 is moved by the selection motor in the direction indicated by arrow x1 in FIG. 6 and moved to a rearward position on the base member 105. At this time, the lift plate 232 is locked by the lock lever 246 and is held in the rearwardly moved position on the base member 105. When the lift plate 232 is locked by the lock lever 246, the cartridge holder 231 is supported on the upper end on the inclined groove 244, the cartridge holder 231 has its supporting shaft 239 supported by the upper end on the inclined grooves 244 of the cam pieces 241, 241 so that the supporting shaft 239 is held in a raised position spaced from the disc table 222 of the disc rotating driving unit 118. When held at a raised position, the cartridge holder 231 is positioned for causing the open end on the front side to face the cartridge entrance/exit opening 110. If the first or second disc cartridge 5, 22 is inserted via the cartridge entrance/exit opening 110 into the cartridge holder 231, the lock lever 246 is intruded into the inserting end of the first or second disc cartridge 5, 22 and rotated. When the first or second disc cartridge 5, 22 is inserted into the pre-set position in the cartridge holder 231, the lock lever 246 is rotated to unlock the lift plate 232. If locking of the lift plate 232 by the lock lever 246 is released, the lift plate 232 is moved in the direction indicated by arrow x2 in FIG. 6 under the bias of the biasing member. If the lift plate 232 is moved in the direction indicated by arrow x2 in FIG. 6, the supporting shaft 239 is moyed along the inclined grooves 244 of the cam pieces 241, 242 towards the lower ends thereof so that the cartridge holder 231 is lowered towards the disc table 222 towards the base member 105 in the direction indicated by arrow L1 in FIG. 6. By the lowering of the cartridge holder 231, the lift plate 232 positions and loads the first or second disc cartridge 5, 22 held on the cartridge holder 231 at the cartridge loading position on the base member 105, at the same time as the first or second magnetic disc 6, 23 housed in the first or second disc cartridge 5, 22 is loaded on the disc table 222.

At this time, the spindle 221 is inserted into spindle holes 8a, 25a formed in the hubs 8, 25, the driving pin 224 is engaged or inserted into a driving pin engagement opening 25a or in the driving pin inserting hole 25b and the hubs 8,25 are attracted by the magnet to set the first or second magnetic disc 6, 23 on the disc table 222 so that the first or second magnetic disc 6, 23 can be rotated in unison with the disc table 222. By the driving of the spindle motor 220, the first or second magnetic disc 6, 23 is rotated in unison with the disc table 222 with an rpm corresponding to the respective recording densities.

When the lock lever 246 controlling the position of the lift plate 232 and the first or second disc cartridge 5, 22 is ejected from the cartridge loading position, the ejection motor in the loading unit 119 is run in rotation on thrusting the ejection button 113 to move the lift plate 232 in the direction indicated by arrow x1 in FIG. 6. The lift plate 232 is moved in the direction indicated by arrow x2 in FIG. 6 to move the cartridge holder 231 to the cartridge inserting/ejecting position, at the same time as the lock lever 246 is rotated to eject the first or second disc cartridge 5, 22 via the cartridge entrance/exit opening 110.

With the head unit 116 including the supporting arm 122 having the first to third portions 131 to 133, it is possible to optimize the tenacity in the pitching and rolling directions and to optimize the gap between the signal recording surface of the second magnetic disc 23 and the head unit 21. Thus, during recording/reproduction, the head portions 121, 121 can optimally follow up with the first magnetic disc 6 in the desired sliding contact state, while the head portions 121, 121 also can optimally follow up with the second magnetic disc 23 in the desired floating state. Therefore, with the head unit 116, it is possible to improve the reliability of the operation during recording/reproduction of, in particular, the second magnetic disc 23.

The disc drive device 100 of the present invention uses the first or second disc cartridge 5,22 as the information recording medium. However, the present invention may also be applied to such a case wherein the information recording medium is a magneto-optical disc removable from the main body portion 101 or a hard disc device.

What is claimed is:

1. A supporting arm assembly for a disc drive comprising:

a head unit having a magnetic head element for recording and/or reproducing information signals for a disc-shaped recording medium, wherein said head unit has a first magnetic head element for recording and/or reproducing information signals in a slide contact state with respect to the disc-shaped recording medium and a second magnetic head element for recording and/or reproducing the information signals in a floated state with respect to the disc-shaped recording medium;

a supporting arm having a first portion for supporting said head unit, a second portion mounted on a supporting arm holding portion and a third portion interconnecting said first and second portions; a flat surface on each of the first and third portions, and wherein bent pieces bent from the flat surface are formed on both width-wise sides of said first portion and the third portion; and wherein the bent height of bent pieces of said first portion is smaller than the bent height of the bent pieces of said third portions forming a step portion, and said head unit is mounted astride said first and third portions on said supporting arm.

2. The magnetic head device according to claim 1 wherein bent pieces bent from a major surface are formed on both width-wise sides of said third portion and wherein said first portion is flat-plate-shaped.

3. The magnetic head device according to claim 1 wherein said supporting arm is designed so that said first portion is adapted to optimize toughness in a direction around an axis extending parallel to the longitudinal direction of said supporting arm;

said second portion is adapted to optimize the distance between the head unit and the disc-shaped recording medium when the head unit is floated with respect to the disc-shaped recording medium; and so that said third portion is adapted to optimize the toughness in a direction around an axis parallel to the width-wise direction of said supporting arm.

* * * * *